United States Patent
Yuen et al.

(10) Patent No.: US 10,694,199 B2
(45) Date of Patent: Jun. 23, 2020

(54) METHOD FOR DISTRIBUTED VIDEO TRANSCODING

(71) Applicant: TFI Digital Media Limited, Hong Kong (HK)

(72) Inventors: Yiu Fai Yuen, Hong Kong (HK); Hok Kwan Cheung, Hong Kong (HK); Chi Keung Fong, Hong Kong (HK); Yin Sze, Hong Kong (HK); Kong Wai Lam, Hong Kong (HK)

(*) Notice: Subject to any disclaimer, the term of this patent is extended or adjusted under 35 U.S.C. 154(b) by 280 days.

(21) Appl. No.: 15/220,390

(22) Filed: Jul. 27, 2016

(65) Prior Publication Data
US 2017/0094290 A1    Mar. 30, 2017

(30) Foreign Application Priority Data

Sep. 24, 2015  (HK) .................................. 15109427.7

(51) Int. Cl.
*H04N 19/40*     (2014.01)
*H04N 19/436*    (2014.01)

(52) U.S. Cl.
CPC ........... *H04N 19/40* (2014.11); *H04N 19/436* (2014.11)

(58) Field of Classification Search
None
See application file for complete search history.

(56) References Cited

U.S. PATENT DOCUMENTS

| | | | | |
|---|---|---|---|---|
| 2007/0133680 A1* | 6/2007 | Kimoto | .................. | H04N 19/62 375/240.12 |
| 2012/0110587 A1* | 5/2012 | Georgis | ................ | G06F 9/5061 718/104 |
| 2014/0059166 A1* | 2/2014 | Mann | ...................... | H04L 65/60 709/217 |
| 2014/0146869 A1 | 5/2014 | Zhang | | |
| 2014/0161174 A1* | 6/2014 | Mohsenian | ............ | H04N 19/30 375/240.02 |
| 2014/0177700 A1* | 6/2014 | Schmidt | ................. | H04N 19/40 375/240.01 |
| 2015/0189225 A1* | 7/2015 | Soroushian | .......... | H04N 7/0127 348/459 |
| 2017/0064329 A1* | 3/2017 | Lawrence | ............ | H04N 19/107 |

FOREIGN PATENT DOCUMENTS

CN          103458270 A       12/2013

OTHER PUBLICATIONS

OA of CN201610005878.3 mailed Apr. 11, 2018.

* cited by examiner

*Primary Examiner* — Kaitlin A Retallick
(74) *Attorney, Agent, or Firm* — W&K IP (57) ABSTRACT

A method for distributed video transcoding consists of segmentation process 101, transcoding process 102 and combining process 103. The said segmentation process consists of time division based segmentation 201, spatial division based segmentation 301 and hybrid segmentation 401. The source media is segmented into a number of media segments. These segments are distributed to different processing units 501. Each processing units consists of source reception unit 502, segmentation unit 503, transcoding unit 504, combining unit 505 and finally result storage unit 506 to achieve parallel conversion throughout the process and combined to produce a single transcoded result. The present invention relates to converting an audio-video source media from one format to another within a short duration of time.

7 Claims, 6 Drawing Sheets

METHOD FOR DISTRIBUTED VIDEO TRANSCODING

CROSS-REFERENCE TO RELATED APPLICATIONS

This application claims the priority benefit of a Hong Kong patent application No. 15109427.7, filed on Sep. 24, 2015. The content of the aforementioned application, including any intervening amendments thereto, is incorporated herein by reference.

TECHNICAL FIELD

The present invention relates to a method for distributed video transcoding. Specifically, the present invention relates to a method of distributing the source media into number of segments to obtain parallel transcoding. Particularly, the transcoded segments of the present invention are combined to produce a single transcoded result.

BACKGROUND OF THE PRESENT INVENTION

Transcoding is a common process that converts a source media from one format to another. For example, transcoding the content on a blu-ray disc to MP4 format which is playable on a tablet or a smart phone. This change of format includes one or more changes in video compression format, video resolution, video frame rate, video data rate, audio compression format, audio sampling rate and audio data rate. Transcoding is a computation intensive and very time-consuming task. The time for transcoding depends on the data amount and the complexity of the compression format.

Video Transcoding generally refers to the digital to digital conversion of data. Most of the times, transcoding a video is done due to the circumstances such as the target device does not support the format that the original data is in, the target device has a reduced capacity such that the capacity of the original file will have to be reduced so that it can fit to the new format and in order to convert incompatible and obsolete file types into a modern format that is better supported by the new device. The process of video transcoding is normally a two-step process. The first part of the process is decoding. This is whereby the original data is transferred to an uncompressed format. The second part of the process is the re-encoding whereby the data will now be transferred to the new device in the desired format.

Various methods for video transcoding has been devised in art; some of the measures are as follows:

US20110274155 relates to video coding and in particular, but not exclusively, to an apparatus, method, and system for distributing video transcoding in a communication network.

US20130049998 relates to transcoding of files containing digital information with plurality of transcoding nodes for transcoding a digital file based on a comparison of a transcoding profile for the digital file.

U.S. Pat. No. 9,037,674 depicts a method of processing information content from a content provider, wherein the computer generates a plurality of pre-transcoded files based on the content, having respectively different formats and the computer receives a request to send the content to a user, and determines a format based on characteristics of the user.

The present invention overcomes the inadequacies of the prior art by providing a method for video transcoding in a distributed manner.

SUMMARY OF PRESENT INVENTION

One or more of the problems of the conventional prior art may be overcome by various embodiments of the present invention.

Accordingly, the primary object of the present invention is to provide a method for distributed video transcoding.

One of the objects of the present invention is to provide a method for distributed video transcoding using segmentation process.

It is one object of the present invention, wherein the segmentation process consists of three different segmentation methods such as time-division based segmentation, spatial-division based segmentation and hybrid segmentation.

It is further object of the present invention, wherein the segmentation process takes place in central processing unit, which comprises of source reception unit, segmentation unit, transcoding unit, combining unit and result storage unit.

It is another object of the present invention, wherein transcoding of segments occur in parallel sequence.

It is yet another object of the present invention, wherein the said transcoded segments are combined to produce single transcoded result.

According to the basic aspect of the present invention there is provided a method for distributed video transcoding comprises of:
  Segmentation process;
  Transcoding process;
  Combination process;
  Wherein the said segmentation process comprises of:
  Time-division based segmentation;
  Spatial-division based segmentation;
  Hybrid segmentation;
  Wherein the said time-division based segmentation divides source media at least in a binary tree pattern into a numerous media segments;
  Wherein the said spatial-division based segmentation segregates the media frame into numerous sub-frames;
  Wherein the said hybrid segmentation distributes the source media by combining the said time-division based segmentation and the said spatial-division based segmentation simultaneously;
  Wherein the said segmentation process and the transcoding process occurs in central processing unit and simultaneously occur at least in one child processing unit;
  Wherein the said central processing unit comprises of:
  Source reception unit;
  Segmentation unit;
  Transcoding unit;
  Combining unit; and
  Result storage unit.

It is one aspect of the present invention, wherein the said hybrid segmentation distributes the source media using at least time-division based segmentation first and then spatial-division based segmentation and vice versa.

It is another aspect of the present invention, wherein the said sub-frames are transcoded in parallel sequence and combined into a single transcoded output.

It is yet another aspect of the present invention, wherein the said source reception unit receives and stores the said source media from external source, whereas the received source media is segregated into numerous media segments in a recursive manner in the said segmentation unit.

It is one aspect of the present invention, wherein a child processing unit is an idle processing unit to process a part of the said segregate media segments.

It is further aspect of the present invention, wherein at least a part of the said segregated media segment is transcoded to a required format in the said transcode unit.

It is another aspect of the present invention, wherein at least a part of the said segregated media segment is distributed to the said child processing unit.

It is one another aspect of the present invention, wherein at least one transcoded media result from the said transcoding unit combines with at least one transcoded media result from the said child processing unit in the said combining unit, whereas the said combined transcoded result is stored in the said result storage unit.

It is another aspect of the present invention, wherein the said transcoded format includes one or more changes in video compression format, video resolution, video frame rate, video data rate, audio compression format, audio sampling rate and audio data rate.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION OF PREFERRED EMBODIMENTS

The present invention will be apparent from the following detailed description, which proceeds with reference to the accompanying drawing, wherein the same references relate to the same elements.

Figure 1:
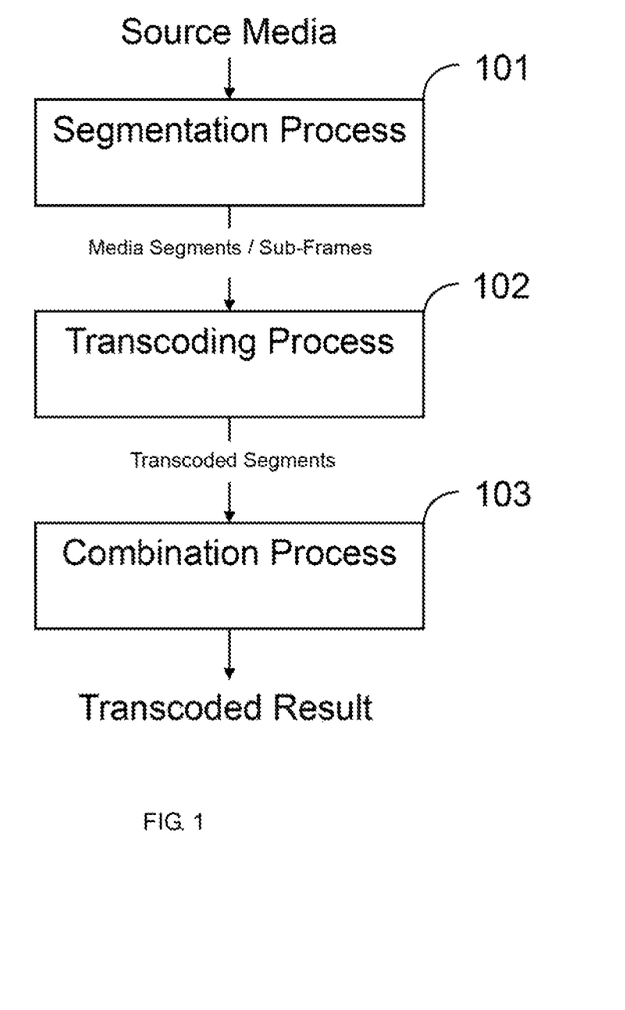
FIG. 1 illustrates the overall view of data flow from the source media to transcoded output, according to the present invention.
Figure 2:
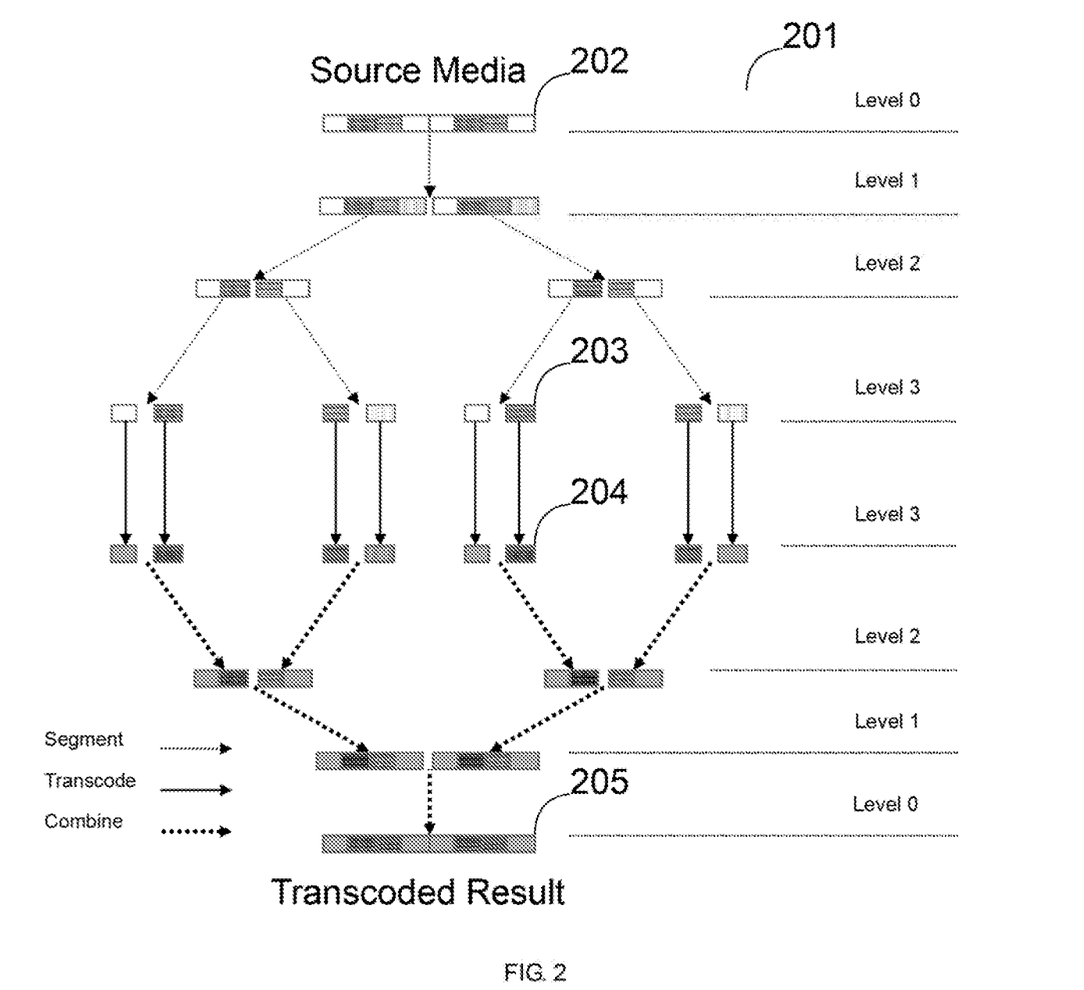
FIG. 2 illustrates the work flow process of time-division based segmentation method, according to present the invention.

With reference to FIG. 1 the method for distributed transcoding receives a source media which is divided into a number of media segments or sub-frames in the segmentation process 101. The said segments are transcoded in the transcoding process 102 in a parallel manner. The transcoded segments are combined into a single final transcoded result in the combining process 103. The said segmentation process 101, deploys at least one of the following three segmentation methods such as time-division based segmentation 201 (FIG. 2), spatial-division based segmentation 301 (FIG. 3), and hybrid of the above two segmentation method 401 (FIG. 4). With reference to FIG. 2, source media 202 is divided into a plurality of media segments 203. In this embodiment, the source media 202 is divided into a plurality of first media segments 203, and then the plurality of first media segments 203 are transcoded to form a plurality of second media segments 204 with the required format. The plurality of second media segments 204 are combined in the next steps and at last form the transcoded result with the required format.

Time-Division Based Segmentation

With reference to FIG. 2 the said time-division based segmentation 201 is a method that divides a long source media 202 into a number of shorter media segments 203.

In offline transcoding or a buffered live transcoding, the duration of said source media is known. Thus, it can be divided at least in a binary tree manner to speed up the segmentation process. Segmentation at the same level processed in parallel sequence. Suppose the time taken to divide a media segment into two is $T_s$. The total time $T_{seq}$ to divide a source media into n segments in a sequential manner will be $$T_{seq} = T_s(n-1).$$

If this is processed in a binary tree manner, the total time $T_{bin}$ will be $$T_{bin} = T_s \times \text{ceil}(\log_2(n))$$

where ceil(x) returns the nearest integer larger or equal to x. The present invention will be faster than conventional sequential segmentation when n≥4 and the difference will increase dramatically as n increases.

Spatial-Division Based Segmentation

Figure 3:
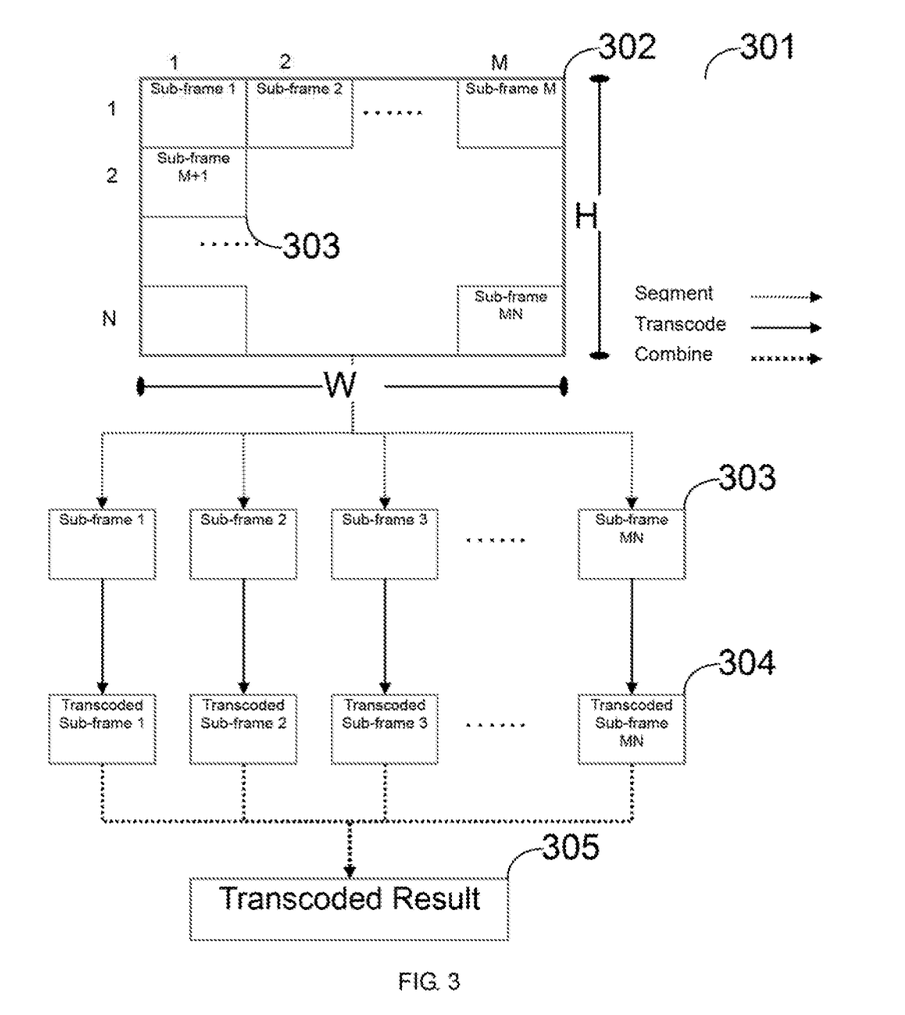
FIG. 3 illustrates the work flow process of spatial-division based segmentation, according to present the invention.
Figure 4:
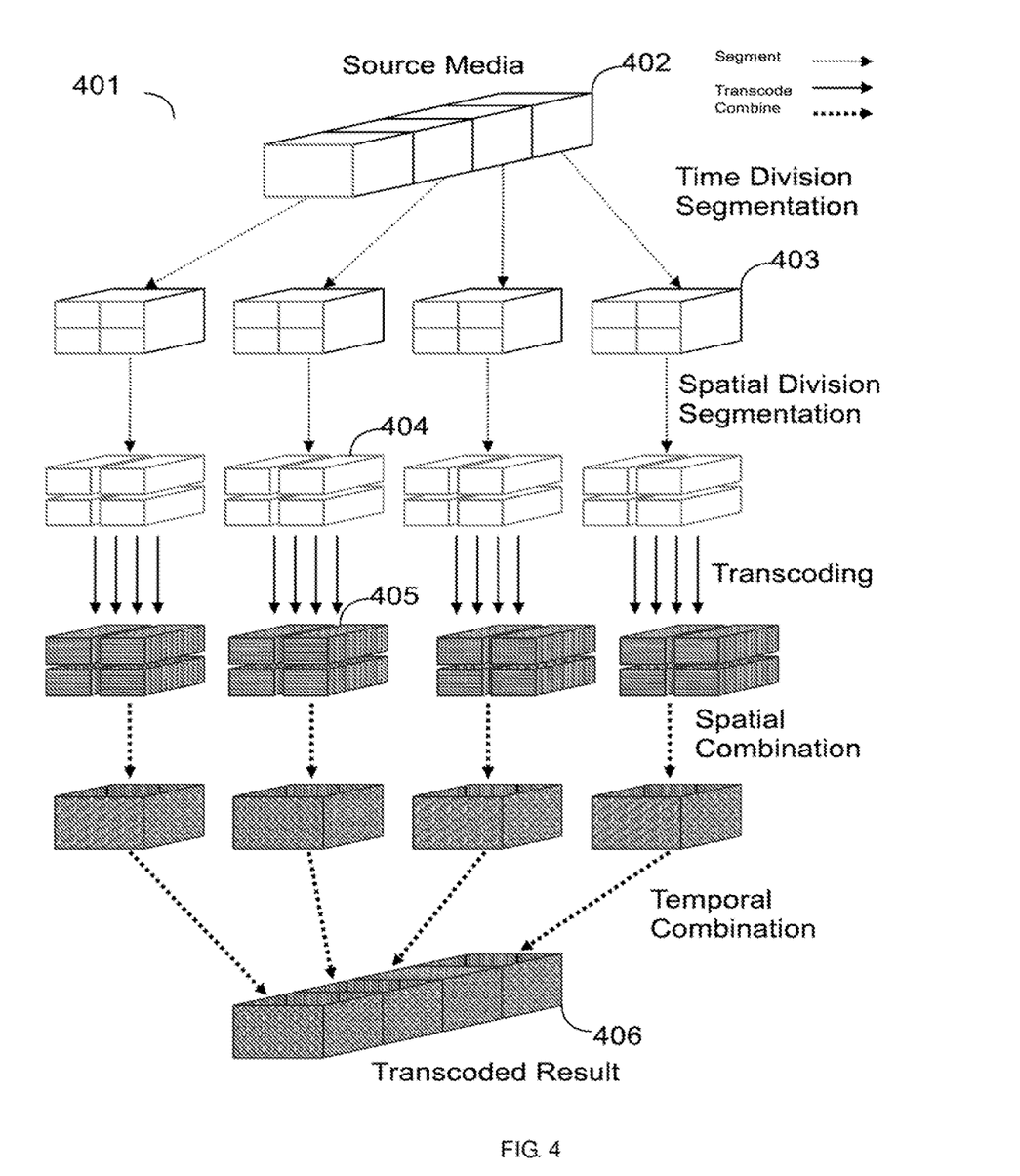
FIG. 4 illustrates the work flow process of hybrid segmentation, according to the present invention.

According to FIG. 3, the said spatial-division based segmentation 301 is preferred as one alternative method for segmentation process when the duration of the said source media cannot be easily obtained. In the said spatial-division based segmentation the said source media can be divided in spatial domain.

In one embodiment of the present invention, the video frame 302 from the said source media with resolution W×H pixels are divided into M×N sub-frames 303. M and N can be any positive integers. Also the shortest side of a sub-frame should be at least 64. The said sub-frames 303 are transcoded in parallel sequence. Finally the transcoded sub-frames 304 are combined into a single transcoded result 305.

Hybrid Segmentation

With reference to FIG. 4, the hybrid segmentation process is one, in which the said time-division based segmentation and the said spatial-division based segmentation collaborate at the same time. The said source media 402 can be divided into n (wherein n≥4) media segments 403 by the time-division based segmentation first and then each temporal-divided media segment 403 is sub-divided into a M×N, for example a 2×2, sub-segment using spatial-division based segmentation to 404. A total of n×M×N media segments are obtained. In this embodiment, for example, n=4, and the total of the media segments will be 4×2×2=16.

The said n×M×N spatially divided media segments 404 are transcoded to n×M×N transcoded segments 405 in parallel sequence with a plurality of processing units. The transcoded segments 405 are first spatially combined and then temporally combined to produce final transcoded result 406. This process would take benefits from both methods.

Segmentation Process

The segmentation process of the present invention is further described using process flowing method, which is only illustrative in the nature and should not be construed to limit the scope of invention.

Figure 5:
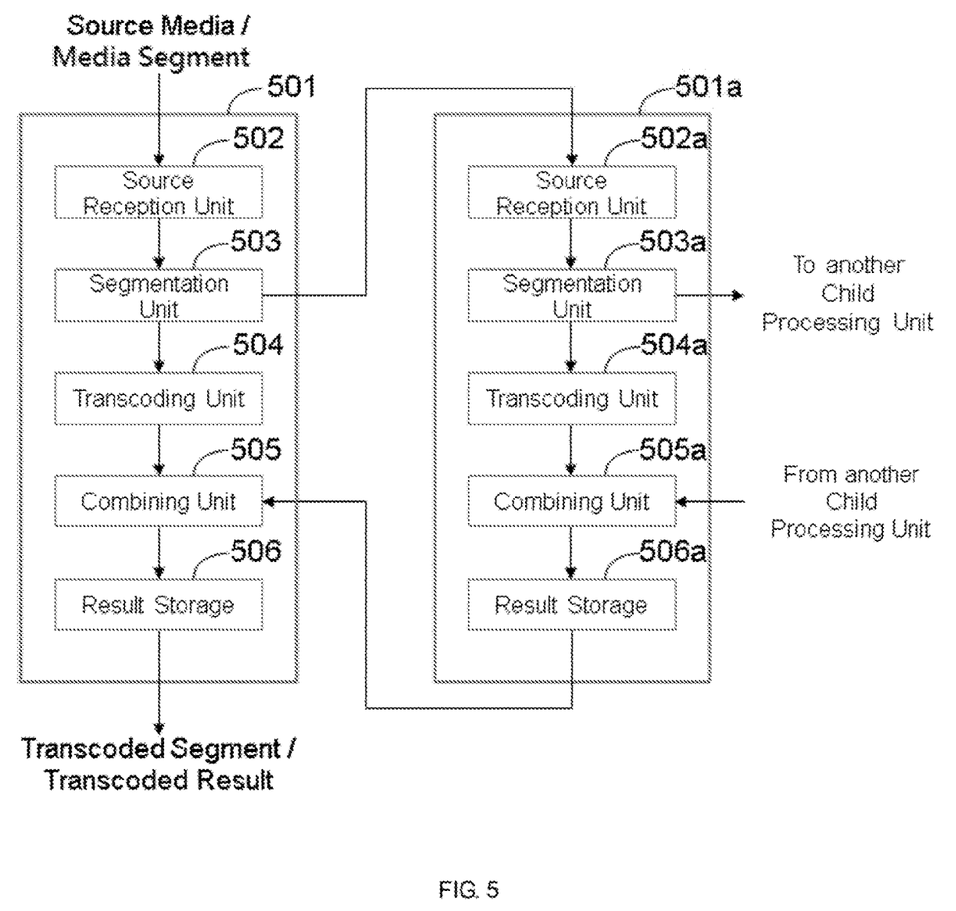
FIG. 5 illustrates the exemplary embodiments and data flow in both central processing unit and child processing unit, according to the present invention.
Figure 6:
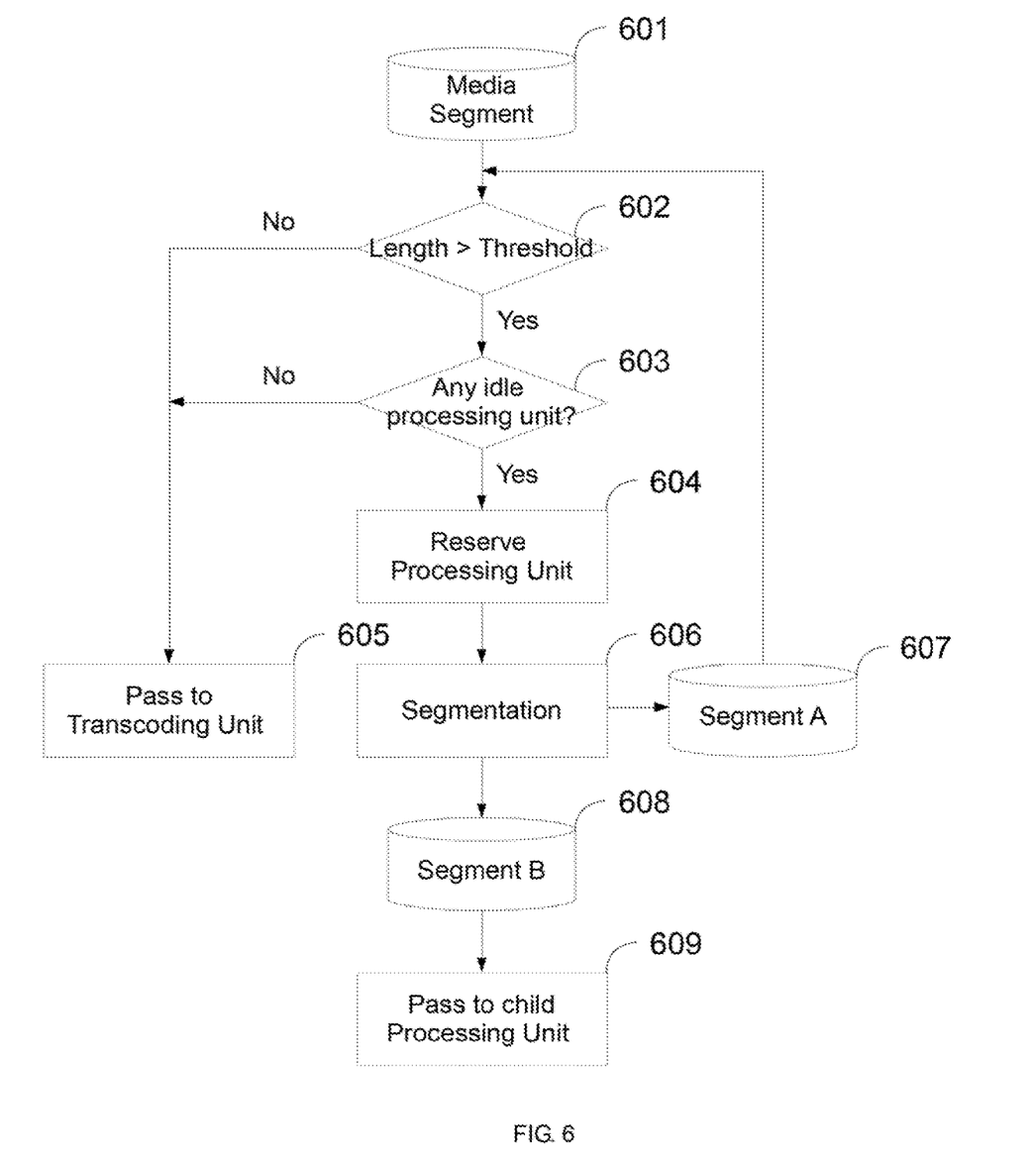
FIG. 6 illustrates the work flow process of media segmentation, according to the present invention.

FIGS. 5 and 6 illustrate the central processing unit 501 of the present invention for performing the segmentation process, according to embodiments of the present invention. The said central processing unit consists of five sub units such as source reception unit 502, segmentation unit 503, transcoding unit 504, combining unit 505 and result storage unit 506. The source media from user or a media segment is received and stored in a source reception unit 502. The received segment is divided into smaller segments in a segmentation unit 503 recursively. The segments are parted, wherein at least one part of the segments are sent to child processing unit 501a for further process and at least one part of the segments are processed directly in transcoding unit 504 when either criteria 602 or 603 cannot be fulfilled. The said child processing unit 501a contains five sub units 502a to 506a similar to central processing unit. The said transcoded segments from child processing units and transcoding units are combined in the said combining unit 505, and the combined result is stored in a result storage unit 506. The result is passed to its parent processing unit for further combination until the final result.

According to the present invention, the segmentation decision is self-adaptive and resource-aware. Only when media segment 601 is longer than a user-defined threshold 602, there occur idle processing units 603 in the computing farm. The said idle processing unit will be reserved 604 and the media segment 601 is further divided into segment A 607 and segment B 608. As shown in FIG. 6, in step 609, the said segment B is sent to reserved child processing unit 501a while segment A is processed in the same central processing unit recursively until either conditions in 601 or 602 cannot be fulfilled. The segment A is sent to the transcoding unit 504 in the central processing unit. This algorithm will maximize the usage of the resource available in the computing farm. As a result, the total transcoding time can be minimized. The decision is solely made inside a processing unit. No excessive communication or synchronization between different processing units is required. Also, no audio-video de-multiplexing is required before segmentation. This prevents the potential audio-video synchronization problem during de-multiplexing and multiplexing process.

The said transcoding process takes place in the transcoding unit 504 of the processing unit 501 and it is obvious to the person skilled in the art so one can convert the format using his own method. The transcoding process in different processing units is running in a parallel sequence and a synchronized manner. The time taken by the transcoding process depends on the media segment length and the complexity of the target compression format. Theoretically, the longer media segment, the more time is required to transcode. As a result of the present invention, the total transcoding time will be minimized if the source media is divided into maximum number of segments under the resource constraint of the computing farm.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

We claim:

1. A method for distributed video transcoding, comprising the following steps:
   S1: receiving a source media;
   S2: dividing the source media into a plurality of first media segments;
   S3: comparing a length of the first media segments with a threshold value, wherein the length is a duration or resolution of the media;
   S4: judging whether or not a processing unit is idle when the length of the first media segments is greater than the threshold value;
   S5: dividing the first media segments into a plurality of first media subsegments when there is an idle processing unit;
   S6: transmitting the first media subsegments to step S3 when the first media segments are divided into the plurality of first media subsegments in step S5;
   S7: transcoding the first media segments/subsegments into a second media segments when the length of the first media segments/subsegments is not greater than the threshold value, wherein each of the second media segments has a target format; or transcoding the first media segments/subsegments into the second media segments when there is not an idle processing unit;
   wherein the step S2 further comprises the following steps:
   dividing the source media into a plurality of first media segments, wherein the first media segments are time-division based media segments;
   dividing a video frame of each of the first media segments into a plurality of first sub-frames, wherein the video frame of the first media segments are divided into the plurality of first sub-frames according to a solution of the video frame;
   wherein in the step S7 further comprises the following steps:
   transcoding the plurality of first sub-frames into a plurality of second sub-frames, wherein the second sub-frames have a target format;
   combining the plurality of second sub-frames to form a plurality of second media segments, wherein the second media segments have the target format; and
   combining the plurality of second media segments to form a transcoded media;
   wherein the transcoded media has the target format.

2. The method of claim 1, wherein the first source media are divided into n first time-division based media segments with a binary tree-structure partition, wherein n≥4.

3. The method of claim 1, wherein the solution of the video frame has W×H pixels, and video frame is divided into M×N first sub-frames, wherein M and N are positive integers.

4. The method of claim 3, wherein the shortest side of each the first sub-frames is at least 64.

5. The method of claim 1, wherein the target format includes one or more changes in video compression format, video resolution, video frame rate, video data rate, audio compression format, audio sampling rate, and audio data rate.

6. A device for distributed video transcoding, the device comprising a central processing unit configured to comprise:
   a source reception unit configured to perform step S1, S1: receiving a source media;
   a segmentation unit configured to perform steps S2 to S6, S2: dividing the source media into a plurality of first media segments; S3: comparing a length of the first media segments with a threshold value, wherein the length is a duration or resolution of the media; S4: judging whether or not a processing unit is idle when the length of the first media segments is greater than the threshold value; S5: dividing the first media segments into a plurality of first media subsegments when there is an idle processing unit; S6: transmitting the first media subsegments to step S3 when the first media segments are divided into the plurality of first media subsegments in step S5;
a transcoding unit and a combining unit configured to perform step S7, S7: transcoding the first media segments/subsegments into a second media segments when the length of the first media segments/subsegments is not greater than the threshold value, wherein each of the second media segments has a target format; or transcoding the first media segments/subsegments into the second media segments when there is not an idle processing unit;
wherein the step S2 further comprises the following steps:
dividing the source media into a plurality of first media segments, wherein the first media segments are time-division based media segments, and dividing a video frame of each of the plurality of first media segments into a plurality of first sub-frames, wherein the video frame of the first media segments are divided into the plurality of first sub-frames according to a solution of the video frame;
wherein the step S7 further comprises the following steps:
the transcoding unit configured to transcode the plurality of first sub-frames into a plurality of second sub-frames, wherein the second sub-frames have a target format; and
the combining unit configured to combine the plurality of second sub-frames to form a plurality of second media segments, wherein the second media segments have the target format, and also configured to combine the plurality of second media segments to form a transcoded media, wherein the transcoded media has the target format.

7. The device of claim 6, wherein the central processing unit further comprises a result storage unit configured to store the transcoded media.

\* \* \* \* \*